(12) United States Patent
Brennan et al.

(10) Patent No.: US 7,062,296 B2
(45) Date of Patent: Jun. 13, 2006

(54) FORCED BEAM SWITCHING IN WIRELESS COMMUNICATION SYSTEMS HAVING SMART ANTENNAS

(75) Inventors: James Brennan, Sammamish, WA (US); Eduardo Casas, Vancouver (CA)

(73) Assignee: Vivato, Inc., Spokane, WA (US)

( * ) Notice: Subject to any disclaimer, the term of this patent is extended or adjusted under 35 U.S.C. 154(b) by 189 days.

(21) Appl. No.: 10/698,848

(22) Filed: Oct. 31, 2003

(65) Prior Publication Data

US 2004/0204114 A1    Oct. 14, 2004

Related U.S. Application Data

(60) Provisional application No. 60/423,660, filed on Nov. 4, 2002.

(51) Int. Cl.
*H04M 1/00* (2006.01)

(52) U.S. Cl. .................... 455/562.1; 455/561

(58) Field of Classification Search ............ 455/562.1, 455/561, 13.3, 25, 63.4; 342/147, 148, 157, 342/158; 343/853
See application file for complete search history.

(56) References Cited

U.S. PATENT DOCUMENTS

| | | | |
|---|---|---|---|
| 5,771,017 A | 6/1998 | Dean et al. | |
| 5,809,141 A | 9/1998 | Dent et al. | |
| 5,987,037 A | 11/1999 | Gans | |
| 6,091,788 A | 7/2000 | Keskitalo et al. | |
| 6,108,323 A | 8/2000 | Gray | |
| 6,141,335 A * | 10/2000 | Kuwahara et al. | 370/342 |
| 6,169,910 B1 | 1/2001 | Tamil et al. | |
| 6,311,075 B1 | 10/2001 | Bevan et al. | |
| 6,337,659 B1 * | 1/2002 | Kim | 342/373 |
| 6,438,376 B1 | 8/2002 | Elliott et al. | |
| 6,470,195 B1 | 10/2002 | Meyer | |
| 6,611,695 B1 | 8/2003 | Periyalwar | |
| 6,628,235 B1 | 9/2003 | Wight | |
| 6,631,277 B1 * | 10/2003 | Eriksson et al. | 455/562.1 |
| 6,850,741 B1 * | 2/2005 | Lei et al. | 455/101 |
| 6,907,269 B1 * | 6/2005 | Yamaguchi et al. | 455/561 |
| 2001/0033600 A1 | 10/2001 | Yang et al. | |
| 2004/0063468 A1 | 4/2004 | Frank | |

FOREIGN PATENT DOCUMENTS

WO    WO 99/21391    4/1999

* cited by examiner

*Primary Examiner*—CongVan Tran
(74) *Attorney, Agent, or Firm*—Lee & Hayes, PLLC

(57) ABSTRACT

Methods and apparatuses are proved which allow a wireless communication system using a smart antenna(s) to selectively cause a receiving device to switch its operative association from one transmitted beam to another available transmitted beam.

48 Claims, 3 Drawing Sheets

FORCED BEAM SWITCHING IN WIRELESS COMMUNICATION SYSTEMS HAVING SMART ANTENNAS

RELATED APPLICATIONS

This application is related to and hereby claims priority to provisional Patent Application Ser. No. 60/423,660, filed Nov. 4, 2002, and titled "A Wireless Data Packet Communications System", and which is included herein by reference.

TECHNICAL FIELD

This invention relates to data communications, and more particularly to methods and apparatuses that allow a wireless communication system using a smart antenna(s) to selectively cause a receiving device to switch its operative association from one transmitted beam to another available transmitted beam.

BACKGROUND

Computers and other like devices can be interconnected in a variety of ways to allow data to be communicated between them. One of the most common ways to provide such data communication is through a wired network. Wired networks, such as, e.g., wide area networks (WANs) and local area networks (LANS) tend to have a high bandwidth and therefore can be configured to carry digital data at high data rates. One obvious drawback to wired networks is that a user's movement is constrained since the computer needs to be physically connected to the network. Thus, for example, a user of a portable computer will need to remain near to a wired network junction to stay connected to the wired network.

An alternative to wired networks is a wireless network that is configured to support similar data communications but in a more accommodating manner. Here, the user of a portable device will be free to move around a region that is supported by the wireless network. A well known example of a wireless network is a cellular telephone network. Indeed, in the past, cellular telephone modems have proven popular for use with portable laptop computers and other like devices, despite their relatively low bandwidth.

In the future it is expected that higher bandwidth wireless networks will become more popular, especially in creating metropolitan area networks (MANs) in which users, i.e., subscribers, have the ability to freely move their portable communicating devices around within a coverage area. Many conventional wireless communication systems and networks tend to use omni-directional antennas to transmit and receive data packets, for example, from a router to a subscriber's device. Being omni-directional, however, such transmissions may interfere with or otherwise restrict the use of other communicating devices that operate in the same frequency band.

Recent improvements to the wireless network sector include the use of smart antennas that are capable of transmitting directed beams to one or more receiving devices (e.g., client devices). One example of a smart antenna based wireless network can be seen in the improved packet switched wireless data communication system described in U.S. Pat. No. 6,611,231, issued Aug. 26, 2003 and titled "Wireless Packet Switched Communication Systems And Networks Using Adaptively Steered Antenna Arrays". Here, for example, a base station (e.g., access point) includes a phased array antenna panel that is configured to transmit a main beam to a client device. The main beam may also have one or more side-lobes as is well understood in the art. The smart antenna in this example may also be configured to receive signals transmitted from the client device.

The above exemplary wireless communication system can be adapted for various different types of communication protocols and/or standards. Currently, a very popular form of wireless communication includes the IEEE 802.11 family of protocols/standards. As currently implemented, these protocols/standards require the receiving device to associate with an access point during initialization, and/or when otherwise deemed necessary. The association process essentially establishes the communication link by having the receiving device detect the presence of available access points, determine which access point is probably the best candidate, attempt to associate with this "best candidate", and if accepted by the best candidate access point, then communicate with that access point. If the receiving device is mobile and subsequently moves out of the coverage area of the access point to which it is associated, then there are provisions in the protocols/standards for the receiving device to attempt to associate with another available access point. This type of re-association process tends to work well for access points that utilize conventional omni-directional or broad beam antennas. However, for wireless communication systems that use smart antennas that produce significantly more narrow and directed beams, the receiving device may not always be able to determine when it should switch its association from one beam to another beam. One potential reason for this is that the receiving device may have moved into an area that is covered by a side lobe of the main intended beam. While the receiving device and access point may be able to continue to communicate via a side lobe in certain situations, it will usually be more preferable for the receiving device to re-associate with another intended main beam that provides coverage to the new location of the receiving device. Indeed, in certain situations, there may be a regulatory need for the receiving device to re-associate with a different intended main beam. For example, under certain regulatory schemes, the narrower point-to-point main beam from a smart antenna arrangement can be transmitted with significantly greater power than would be allowed for a point-to-multipoint omni-directional antenna arrangement.

Consequently, there is a need to for methods and apparatuses that will effectively cause a receiving device to switch beam association within a smart antenna based wireless communication system at selected times.

SUMMARY

Methods and apparatuses are proved which allow a wireless communication system using a smart antenna(s) to selectively cause a receiving device to switch its operative association from one transmitted beam to another available transmitted beam.

By way of example, the above stated needs and others are met by a method for use in a wireless communication system, in accordance with certain aspects of the present invention. The method includes configuring a first device (such as, e.g., an access point device), having a smart antenna to selectively allow a second device (such as, e.g., a client device) to operatively associate with a beam downlink transmittable to the second device using the smart antenna. The method also includes configuring the first device to determine information from at least one uplink transmission receivable from the second device through the smart antenna and configuring the first device to determine if the associated second device should operatively associate with a different beam downlink transmittable using the smart antenna based on the determined information. If the associated second device should operatively associate with a different beam, then the method also includes configuring the first device to allow the second device to operatively associate with the different beam.

Yet another exemplary method, includes determining if a client device that is currently operatively associated with a beam that is being downlink transmitted to the client device from an access point device using a smart antenna should instead be operatively associated with a different beam downlink transmitted from the smart antenna based on information determined from at least one uplink transmission received from the client device through the smart antenna. If determined that the associated client device should be operatively associated with a different beam, then the method also includes causing the access point device to force the client device to operatively associate with the different beam.

A computer-readable medium having computer executable instructions for causing logic to perform certain acts is also provided. The computer-readable medium may include any conventional object suitably configured, for example, electrically stored information in memory, magnetically stored information on a disk drive, floppy disk, tape, etc., optically detectable stored information on an optical disc (e.g., CD, DVD), and the like. In certain implementations the acts to be performed include configuring a first device having a smart antenna to selectively allow a second device to operatively associate with a beam downlink transmittable to the second device using the smart antenna, configuring the first device to determine information from at least one uplink transmission receivable from the second device through the smart antenna, configuring the first device to determine if the associated second device should operatively associate with a different beam downlink transmittable using the smart antenna based on the determined information, and if the associated second device should operatively associate with a different beam, then configuring the first device to allow the second device to operatively associate with the different beam.

In still other exemplary implementations, an apparatus is provided for use in a wireless communication system. The apparatus includes a means for transmitting a plurality of smart antenna beams, a means for determining if a client device that is currently operatively associated with a first smart antenna beam should instead be operatively associated with a second smart antenna beam based on information determined from at least one transmission received from the client device, and a means for forcing the client device to operatively associate with the second smart antenna beam when it is determined that the client device should be operatively associated with second smart antenna beam.

By way of further example, a wireless communication system is provided, which includes at least one client device, and at least one access point device operatively coupled to the client device over a wireless link and therein capable of transmitting a plurality of smart antenna beams, determining if the client device that is currently operatively associated with a first smart antenna beam should instead be operatively associated with a second smart antenna beam based on information determined from at least one transmission received from the client device, and causing the client device to operatively associate with the second smart antenna beam when it is determined that the client device should be operatively associated with second smart antenna beam.

DETAILED DESCRIPTION

Certain methods and apparatuses are described herein in accordance with certain implementations of the present invention. These methods and apparatuses can be configured to selectively force and/or otherwise cause a receiving device, client device or the like to switch its beam association from one main beam to another main beam transmitted from a smart antenna. Here, for example, the smart antenna may include a directional/adaptive antenna that is configured with a base station, access point device or the like within a wireless communication system/network. The exemplary methods and apparatuses are adaptable to various protocols and/or standards. For demonstrative purposes and not by way of limitation, the examples presented herein are directed towards wireless IEEE 802.11 type network configurations, wherein the client device is capable of roaming within the coverage area of the smart antenna and the client device is configured to establish an association with an access point over a main beam.

Before describing the exemplary methods and apparatuses, it should first be understood that as used herein, the term "logic" is meant to convey a broad range of implementation capabilities and/or design choices, and is not meant to limit the scope of the methods and apparatuses to just digital logic circuitry. By way of example, in certain implementations, the term "logic" may include hardware, firmware, software, digital logic, analog logic, other forms of circuitry, memory, data, processing units, computer instructions, input/output devices, a combination of one or more of these and/or any other form of technology capable of performing at least a part of the methods and/or apparatuses described herein.

Figure 1:
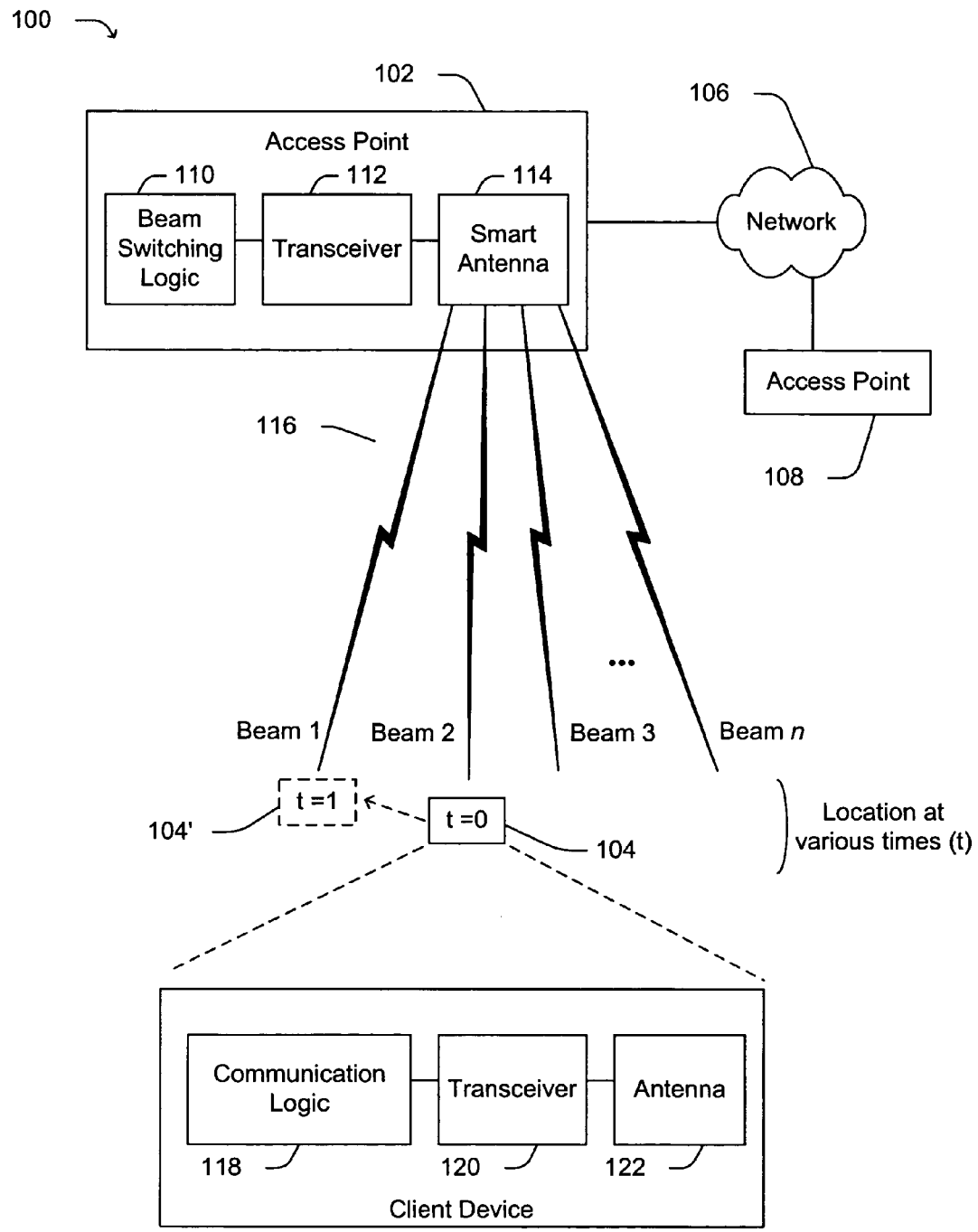
FIG. 1 is a block diagram depicting a wireless communication system having at least one access point device configured to cause a receiving client device to switch between transmitted beams in selected times, in accordance with certain exemplary implementations of the present invention.

With this mind, attention is drawn to FIG. 1, which is a block diagram depicting a wireless communication system 100 having at least one access point device 102 configured to cause a receiving client device 104 to switch between transmitted main beams 116 at selected times, in accordance with certain exemplary implementations of the present invention.

Here, access point device 102 is illustratively shown as being in communication with client device 104 at a time (t=0) over a main beam 116 (shown as Beam 2). To support this communication capability, access point device 102 includes beam switching logic 110, at least one transceiver 112 and smart antenna 114. Smart antenna 114 in this example, is operatively coupled to transceiver 112 and configured to transmit a plurality of main beams 116 in response to corresponding transmit signal(s) output by transceiver 112. Smart antenna 114 in this example is also capable of receiving signals transmitted by client device 104. By way of further example, smart antenna 114 may include one or more phased array antenna panels having a plurality of transmit and/or receive 11 elements (not shown) (see, e.g., U.S. Pat. No. 6,611,231). Other smart antenna designs may also be employed.

While the main beams 116 are illustrated in FIG. 1 by sharp transmission bolts, those skilled in the art will clearly recognize that the shape of the coverage area for the transmitted main beams will spread out a bit and that there will likely be some reduced/attenuated side lobes created. The actual shape and size of the coverage area and/or signal strengths of the main beam and/or applicable side lobes is not crucial to understanding of the present invention, especially since there are many variables involved in an actual environment. Here, the point is that a main beam from a smart antenna has a significantly narrower beam when compared to an omni-directional antenna. In certain implementations, this narrow beam allows the smart antenna to transmit with greater power while adhering to regulatory limitations. The result is that access point 102 may provide a larger coverage area than would a conventional omni-directional access point.

Transceiver 112 in this example is configured to support the communication process between access point device 102 and client device 104. Transceiver 112 is configured to support transmission and reception. Those skilled in the art will recognize that transceiver 112 may take various conventional forms depending on the type of wireless communication system 100.

As illustrated in this example, beam switching logic 110 is provided within access point device 102 and configured operate with transceiver 112. In certain implementations, beam switching logic 110 is configured to determine when client device 104 should change from one main beam to another main beam, and to cause client device 104 to do so. As such and as described in greater detail below, beam switching logic 110 may passively and/or actively detect/estimate the location of client device 104 with respect to smart antenna 114 and/or selected main beams transmitted thereby. To accomplish this, for example, beam switching logic 110 can be configured to access/receive information from transceiver 112 about the signals received from client device 104 and/or to cause transceiver 112 to transmit certain information to client device 104. When it determined by beam switching logic 110 that client device 104 is associated with the "wrong beam" then beam switching logic 110 will cause client device 104 to re-associate with another main beam 116 by altering the operation of transceiver 112 in some manner. For example, beam switching logic 110 in certain implementations causes transceiver 112 to send de-associate message information to client device 104. In other implementations, beam switching logic 110 may determine which client devices are allowed to successfully associate with each main beam, for example by maintaining data or lists of "allowed" and/or "not allowed" client device identifiers. In still other implementations, for example, beam switching logic 110 may simply force transceiver 112 to temporarily stop communicating with one or more of the main beams such that client device 104 determines that it needs to find a different main beam to associate with. These exemplary techniques are described in greater detail below.

In this example, client device 104 includes communication logic 118, a transceiver 120 and an antenna 122. Communication logic 118 is configured to perform the association process in accordance with the protocols/standards implemented by wireless communication system 100. In certain implementations, for example, communication logic 118 would therefore be configured to perform an association process that establishes a communication link under IEEE 802.11(a), IEEE 802.11(b), IEEE 802.11(g), etc. Here, for example, access point 102 may be configured to transmit unique beacon or other like message information over each main beam 116 (and applicable side lobes); one or more of which transmissions may be received by transceiver 120 via antenna 122. Communication logic 118 can then determine which received signal/beam to try to associate with first. Thus, a priority or other like scheme may be implemented wherein communication logic 118 decides to try to associate with the beam with the strongest/cleanest beam/signal first and if that fails then to try to associate with the next strongest/cleanest beam/signal next, and so on, until successfully associated with a beam. In this exemplary scheme, to succeed in the attempted association, client device 104 will need to receive some indication of acceptance from access point 102 over the applicable main beam 116. These and other types of handshaking/approval association processes are well known.

In FIG. 1, client device 104 is illustratively depicted as moving from one location within the accepted coverage area of main "Beam 2" at time (t=0) to another location outside of the accepted coverage area of main "Beam 2" at a later time (t=1). At the later time (t=1), as marked by client device 104', the client device is assumed to be within the accepted coverage area of main "Beam 1". It may also be the case that client device 104' may still be able to communicate with access point 102 via a side lobe of main "Beam 2", but that this situation may be determined unacceptable by beam switching logic 110 leading it to force or otherwise cause the client device to instead associate with main "Beam 1" rather than remain associated with main "Beam 2".

Also depicted in FIG. 1 are a network 106 and another access point 108. These are representative of other possible devices that may be further configured to participate in the forced beam switching methods and apparatuses as described herein. For example, beam switching logic 110 may coordinate with similar logic in access point 108 via network 106 or through other communication links such that information is shared that allows client device 104 to associate with a beam/signal from access point 108 instead of a main beam 116 from access point 102 in certain instances. Thus, in certain implementations the methods and apparatuses are configured to support intra-panel roaming/beam-switching, while in other implementations the methods and apparatuses can be extended to include multiple panel/access point roaming/beam-switching should the client device location change enough to warrant it.

Figure 2:
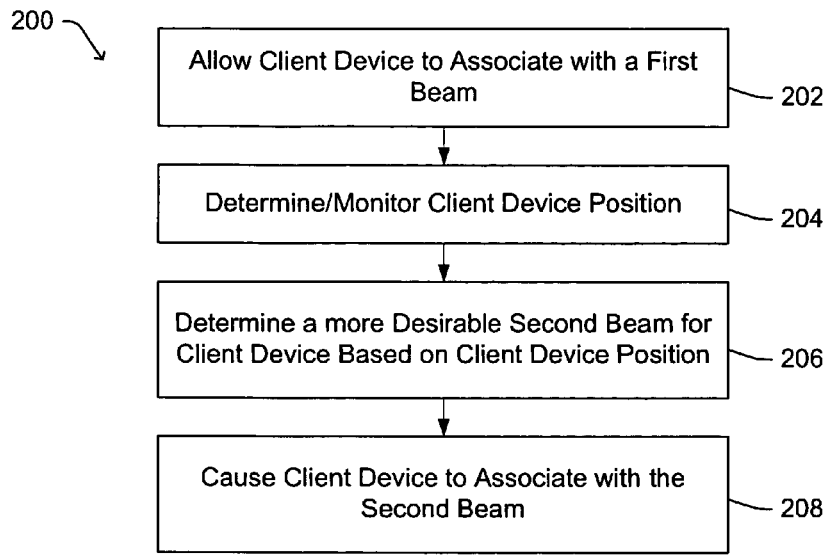
FIG. 2 is a flow diagram of a method for use in a wireless communication system, for example, as in FIG. 1, in accordance with certain exemplary implementations of the present invention.

Attention is now drawn to FIG. 2, which is a flow diagram of a method 200 for use in wireless communication system 100, for example, in accordance with certain exemplary implementations of the present invention.

In act 202, client device 104 is allowed to operatively associate with access point 102 over main "Beam 2", e.g., as previously described.

Next, in act 204, access point 102 determines or otherwise estimates the location of client device 104. Act 204 may include, for example, configuring beam switching logic 110 to passively measure/monitor the signal strength and/or other like parameters(s) for transmitted signals received from client device 104 through various elements of smart antenna 114 by transceiver 112 and based on this information calculate a position of client device 104. Thus, for example, angular direction(s) may be determined from a comparison of received signals picked up by the various elements of the smart antenna array and so too might an estimated distance from access point be determined. In certain implementations, act 204 is passively conducted over a certain period of time so as to not force a re-association prematurely doe to slight signal variations/interferences. Some additional exemplary implementation details that may be employed for this type of passive client device location monitoring scheme are presented in subsequent sections.

Act 204 may instead and/or in addition employ an active client device location monitoring scheme. Here, beam switching logic 110 may be configured to cause transceiver 112 to periodically send out probe information over one or more selected main beams that elicit some form of acknowledgement in return if received by client device 104. In this manner, beam switching logic 110 actively probes the coverage areas for each main beam 116 and based on the acknowledging response(s) or lack thereof from client device 104, can monitor or otherwise estimate the likely relative location of client device 104 within the coverage area of access point 102 at a given time or over a period of time.

Next, in act 206, based on the client device location information gathered in act 204, beam switching logic 110 determines if the main beam 116 to which client device 104 is presently associated with is the "correct beam" or the "wrong beam". This determination may consider, for example, estimated location of the client device (e.g., angular parameters, distance parameters, and the like), signal parameters (e.g., amplitude, phase, noise level, interfering signals, etc.). The determination in act 206 may also cause beam switching logic 110 to compare one or more of these or other like parameters to corresponding threshold or similar values to determine if/when a beam switch should be made by the client device. In certain further implementations, beam switching logic 110 may also be configured to make the determination in act 206 based on data traffic or other like information about the present communication performance of access point 102, client device 104 and/or access point 108. Here, one desire may be to avoid or delay causing the client device to switch beams if as a result there will be a significant degradation in the communications currently being supported by system 100.

In act 208, the client device is forced or otherwise made to associate with a different main beam. For example, in certain implementations beam switching logic 110 may be configured to temporarily halt transmission of at least the main beam 116 to which client device 104 is currently associated with. The resulting loss of signal in this case will require communication logic 118 to attempt to associate with an available main beam. This act of "shutting off" a beam may not provide the best solution, however, in some configurations.

Figure 3:
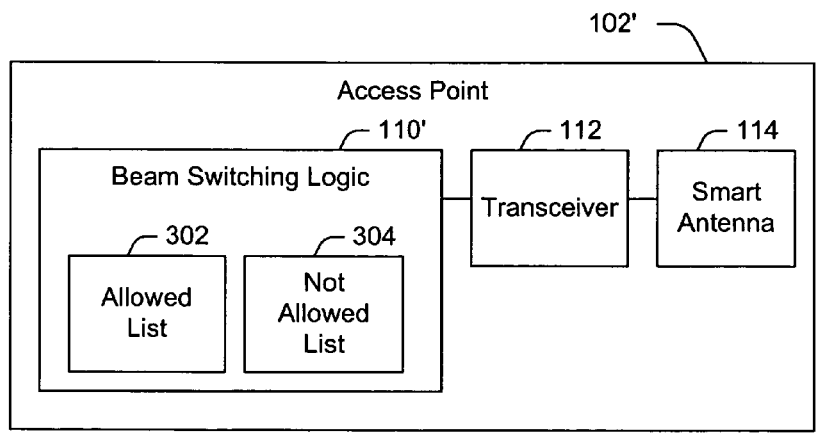
FIG. 3 is block diagram depicting certain features of another access point device, in accordance with certain further exemplary implementations of the present invention.

Another technique that can be employed to achieve act 208 is to configure beam switching logic 110 to cause transceiver 112 send some form of disassociate information to client device 104 over the current associated main beam. In response to receiving the disassociate information (possibly via a side lobe), communication logic 118 will initiate a new association process. To prevent communication logic 118 from simply trying to re-associate with the same main beam again, beam switching logic 110 may also be configured to selectively disallow the attempted re-association request. Hence, for example, as depicted in FIG. 3, an access point 102' having beam switching logic 110' may include an allowed list 302 and a not allowed list 304 that specifies in some manner which client devices may associate with which main beams. Here, for example, in the beam switch example illustrated in FIG. 1, a unique identifier for client device 104 may be listed in allowed list 302 for main "Beam 1" and in the not allowed list 304 for main "Beam 2". In certain implementations, it may be further useful to reduce the number of allowed or not allowed beam associations in an effort to force client device 104 to more quickly switch to a specific (e.g., "correct") beam. After the client device has been re-associated to the "correct beam" or at least away from the "wrong beam", then the information in lists 302 and/or 304 may be changed. In certain implementations this change in the list information may be configured to automatically occur after a period of time has passed. In certain implementations not allowed list 304 is referred to as a "blacklist" wherein the client device is at least temporarily blacklisted from associating with one or more main beams.

Those skilled in the art will recognize that other filtering/exclusion schemes may also be employed to achieve act 208. Furthermore, while the term "list" has been used in this exemplary implementation, in other implementations other forms of data representation may be used.

One of the benefits to method 200 is that conventional IEEE 802.11 family compliant client devices need not be changed or altered to work with the methods and apparatuses described herein. Thus, for these types of systems, only access point 102 and possibly access point 108 need to be altered or modified.

Figure 4:
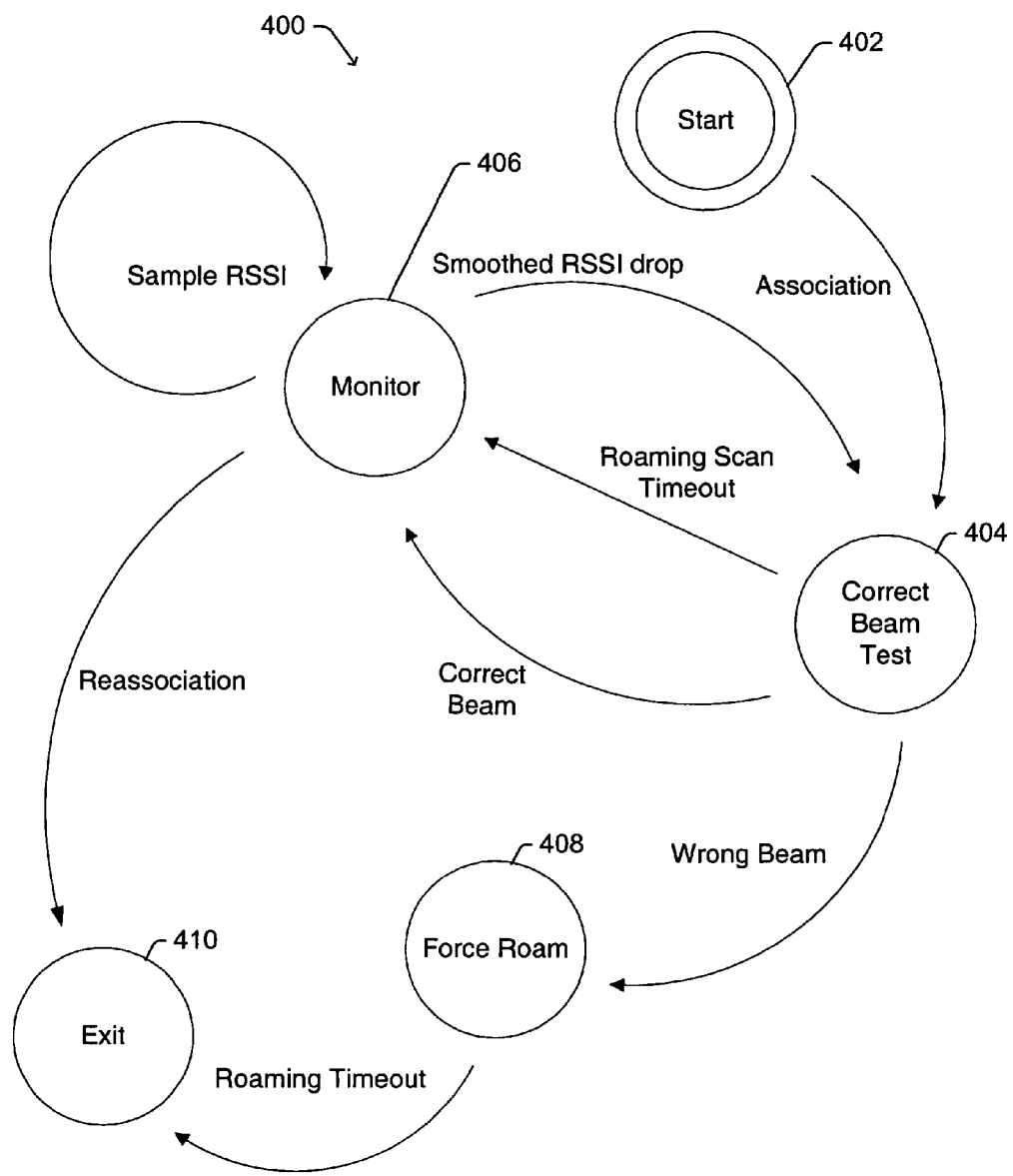
FIG. 4 is an exemplary state diagram for passively detecting when to cause a receiving client device to switch beam association, in accordance with certain implementations of the present invention.

Attention is now drawn to FIG. 4, which is an exemplary state diagram for a method 400 that passively detects when to force/cause receiving client device 104 to switch its beam association, in accordance with certain further implementations of the present invention.

State 402 is a "start" state that transitions to the next state with the successful association of client device 104 to a main beam 116. State 404 is a "correct beam test" state from which, if a "wrong beam" determination is made by beam switching logic 110, then there is a transition to a "force roam" state 408. Force roam state 408 transitions to an "exit" state 410 upon a roaming timeout determination.

Back in the correct beam test state 404, a correct beam determination leads to a transition to a "monitor state" 406. Monitor state 406 includes a loop for sampling RSSI. A determination of a smoothed RSSI drop in monitor state 406 causes a transition back to correct beam test state 404. A determination that the client device 104 has re-associated with another beam in monitor state 406 leads to a transition to exit state 410. A roaming scan timeout determination in correct beam test 404 causes a transition to monitor state 406.

Some desired outcomes of this exemplary method included substantially ensuring that transmissions from access point device 102 are directed to the correct location and also that client device 104 is associated to the "correct" main beam.

The roaming algorithm in this exemplary method disassociates the client device once it moves out of the associated main beam's coverage area. However, such movement can be difficult to detect in the wireless environment and disassociation may result in packet loss and long association procedure. The effect is particularly significant for client devices that happen to be located between two neighboring main beams. Thus, this exemplary roaming algorithm disassociates the client device when there is a significant enough difference between signal qualities on different main beams.

In monitor state 406, once a client is associated to a main beam, beam switching logic 110 using transceiver 112 continues to collect RSSI values for each packet received from client device 104. Logic 110 then recalculates a new measure called a Smoothed RSSI Value and over a window size of RSSI Window Size and compares it to a threshold called RSSI Lower Control Limit.

In correct beam test state 404, a scanning radio or other like portion of transceiver 112 is used to measure the RSSIs and logic 110 calculates the Smoothed RSSI Value for client device 104 on at least each of the adjacent main beams. RSSI Window Size samples for the two adjacent main beams are then averaged and compared to the same parameter for the current main beam to determine the "correct beam" or conversely the "wrong beam".

In force roam state 408, logic 110 adds an identifier for client device 104 to a temporary blacklist so that it cannot associate to the current main beam. Then logic 110 causes client device 104 to dissociate the current main beam.

The roaming scan timeout determination in this example occurs when transceiver 112 has been monitoring the neighboring beams for more than Roaming Scan Timeout value without any decision about the correct beam.

The wrong beam determination can occur, for example, when the scan indicates a better main beam, e.g., having an RSSI that exceeds the RSSI of the current main beam by Signal Drop Threshold (e.g., some dB value).

There are a number of different ways to calculate the RSSI Lower Control Limit. For example, one way is to use both a mean of RSSI and two times standard deviation or $2\sigma$. For example, the RSSI Lower Control Limit may be calculated as follows;

$$RSSI \text{ Lower Control Limit} = \overline{RSSI} - 2\sigma$$

$$\overline{RSSI} = \frac{1}{N}\sum_{i=0}^{N-1} RSSI_i,$$

where N=RSSI Window Size in frames.

$$\sigma = \sqrt{\frac{1}{N}\sum_{i=0}^{N-1}(RSSI_i - \overline{RSSI})^2}$$

where $RSSI_i$ is the RSSI value reported for frame i. The $N-1^{th}$ frame is the most recent frame.

Figure 5:
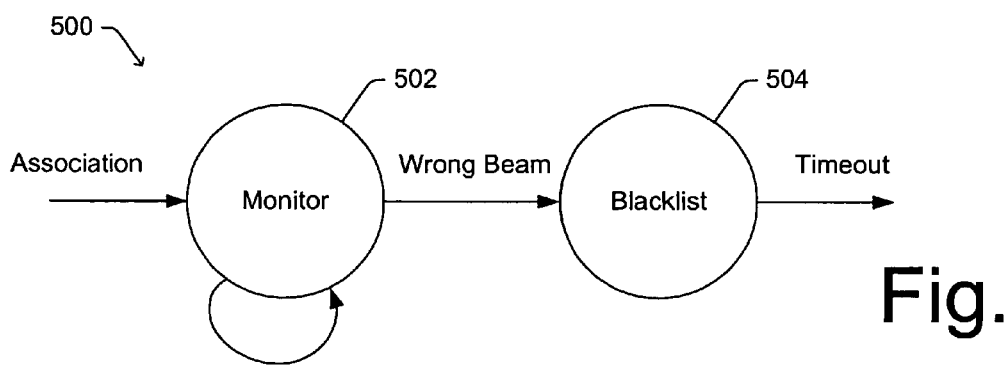
FIG. 5 is an exemplary state diagram for actively detecting when to cause a receiving client device to switch beam association, in accordance with certain other implementations of the present invention.

Attention is now drawn to FIG. 5, which illustrates yet another exemplary method 500 using a state transition diagram. This method can be employed to actively probe and monitor client device 104 as part of a best beam test (BBT) procedure. Method 500 is configured to periodically measure the uplink RSSI for client device 104 on all possible main beams 116. This measured information is then used to ensure that client device 104 is associated with the "best" beam.

As shown in FIG. 5, method 500 includes a monitor state 502 and a blacklist state 504. Method 500 can be configured such that a small but sufficient number of measurements are made.

In monitor state 502, the RSSI of data frames and from best beam testing are collected and averaged (e.g., in linear power units) over a sliding window of a Beam Test Min Window Frames (e.g., default 6 frames). In blacklist state 504, a delay is implemented to allow client device 104 to re-associate with another main beam.

To transition to monitor state, client device 104 associates with a main beam 116. This typically occurs when client 104 is initialized. To transition from monitor state 502 to blacklist state 504, a wrong beam determination is made. For example, this can occur when the best beam testing indicates a better beam whose average RSSI exceeds the average RSSI of the current beam by a Best Beam Threshold (e.g., default 10 dB). Client device 104 is then "blacklisted" so that it cannot re-associate to the current main beam. Client device 104 is then disassociated. A timeout determination occurs after a Roaming Timeout (e.g., default 30 seconds) and as a result client device 104 is removed from the blacklist and all client state is removed.

The BBT can be configured to support a plurality of client devices that are concurrently communicating with access point device 102. For example, once Beam Test Period (e.g., default 1 sec.) is satisfied, then a client device can be selected from among the client devices associated with a main beam. The client device selected can be the one with the longest elapsed time since it was last tested that also meets certain other requirements. For example, a client device may need to meet the following additional conditions: (a) more then a Beam Test Min Interval (e.g., default 10 seconds) have elapsed since the last execution of BBT of this client device; and (b) more than a Beam Test Min Frames (e.g., default 10) data frames have been sent or received to/from this client device since the last execution of a BBT of this client device. When such a client device is found, then a null-data frame (e.g., frame type Data, subtype Null function) or other like probing communication can be sent to the this client device from each main beam 116. The RSSI of each corresponding ACK received can then be used to determine if the wrong main beam is being used.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for use in a wireless communication system, the method comprising:
    configuring a first device having a smart antenna to selectively allow a second device to operatively associate with a beam downlink transmittable to said second device using said smart antenna;
    configuring said first device to determine information from at least one uplink transmission receivable from said second device through said smart antenna;
    configuring said first device to determine if said associated second device should operatively associate with a different beam downlink transmittable using said smart antenna based on said determined information; and if said associated second device should operatively associate with a different beam, then configuring said first device to allow said second device to operatively associate with said different beam by at least one of configuring said first device to identify that said second device is allowed to operatively associate with said different beam, or configuring said first device to identify that said second device is not allowed to operatively associate with said beam.

2. The method as recited in claim 1, wherein said first device includes an access point device and said second device includes a client device.

3. The method as recited in claim 1, wherein configuring said first device to determine information from at least one uplink transmission receivable from said second device through said smart antenna further includes:

configuring said first device to be capable of receiving uplink transmittable messages through said smart antenna; and configuring said first device to be capable of passively gathering signal parameter information from a plurality of said uplink transmittable messages.

4. The method as recited in claim 1, wherein configuring said first device to determine information from at least one uplink transmission receivable from said second device through said smart antenna further includes:

configuring said first device to be capable of receiving at least one uplink transmittable message through said smart antenna;

configuring said first device to actively probe said second device by outputting a signal suitable for causing said smart antenna to transmit at least one downlink transmittable message over at least said different beam; and configuring said first device to gather signal parameter information from said least one uplink transmittable message.

5. The method as recited in claim 4, wherein configuring said first device to determine information from at least one uplink transmission receivable from said second device through said smart antenna further includes:

configuring said first device to be capable of receiving a plurality of uplink transmittable messages through said smart antenna;

configuring said first device to actively probe said second device by outputting a signal suitable for causing said smart antenna to transmit at least one downlink transmittable message separately over each of a group of beams comprising said beam and said different beam; and configuring said first device to gather signal parameter information from each of said plurality of uplink transmittable messages.

6. The method as recited in claim 1, wherein configuring said first device to determine information from at least one uplink transmission receivable from said second device through said smart antenna further includes:

configuring said first device to be capable of determining information about a current position of said second device relative to said smart antenna.

7. The method as recited in claim 1, wherein configuring said first device to determine if said associated second device should operatively associate with said different beam downlink transmittable using said smart antenna based on said determined information further includes:

configuring said first device to be capable of comparing said determined information to corresponding beam association threshold information.

8. A method for use in a wireless communication system, the method comprising:

determining if a client device that is currently operatively associated with a beam that is being downlink transmitted to said client device from an access point device using a smart antenna should instead be operatively associated with a different beam downlink transmitted from said smart antenna based on information determined from at least one uplink transmission received from said client device through said smart antenna; and if determined that said associated client device should be operatively associated with a different beam, then causing said access point device to force said client device to operatively associate with said different beam by causing said access point device to temporarily stop transmitting to said client device using said beam.

9. The method as recited in claim 8, wherein determining if said client device that is currently operatively associated with said beam should instead be operatively associated with said different beam further includes:

with said access point device, receiving uplink transmittable messages from said client device through said smart antenna and passively gathering signal parameter information from a plurality of said uplink transmittable messages.

10. The method as recited in claim 8, wherein determining if said client device that is currently operatively associated with said beam should instead be operatively associated with said different beam further includes:

causing said access point device to transmit at least one probe message to said client device over at least said different beam;

receiving at least one uplink transmitted probe response message in response to said probe message through said smart antenna; and gathering signal parameter information from said probe response message.

11. The method as recited in claim 10, wherein determining if said client device that is currently operatively associated with said beam should instead be operatively associated with said different beam further includes:

comparing said signal parameter information to corresponding beam association threshold information.

12. The method as recited in claim 10, wherein determining if said client device that is currently operatively associated with said beam should instead be operatively associated with said different beam further includes:

causing said first device to transmit at least one downlink transmitted probe message separately over each of a group of beams comprising said beam and said different beam;

receiving a plurality of corresponding uplink transmitted prove response messages through said smart antenna; and gathering signal parameter information from each of said plurality of probe response messages.

13. The method as recited in claim 12, wherein determining if said client device that is currently operatively associated with said beam should instead be operatively associated with said different beam further includes:

comparing said signal parameter information to corresponding beam association threshold information.

14. The method as recited in claim 8, wherein determining if said client device that is currently operatively associated with said beam should instead be operatively associated with said different beam further includes:

determining information about a current position of said client device relative to said smart antenna.

15. The method as recited in claim 8, wherein causing said access point device to force said client device to operatively associate with said different beam further includes at least one of the following:

identifying that said client device is allowed to operatively associate with said different beam; and identifying that said client device is not allowed to operatively associate with said beam.

16. The method as recited in claim 8, wherein causing said access point device to force said client device to operatively associate with said different beam further includes:

causing said access point device to send a disassociate message to said client device.

17. A computer-readable medium having computer executable instructions for causing logic to perform acts comprising:

configuring a first device having a smart antenna to selectively allow a second device to operatively associate with a beam downlink transmittable to said second device using said smart antenna;

configuring said first device to determine information from at least one uplink transmission receivable from said second device through said smart antenna;

configuring said first device to determine if said associated second device should operatively associate with a different beam downlink transmittable using said smart antenna based on said determined information; and if said associated second device should operatively associate with a different beam, then configuring said first device to allow said second device to operatively associate with said different beam by at least one of configuring said first device to identify that said second device is allowed to operatively associate with said different beam, or configuring said first device to identify that said second device is not allowed to operatively associate with said beam.

18. The computer-readable medium as recited in claim 17, wherein said first device includes an access point device and said second device includes a client device.

19. The computer-readable medium as recited in claim 17, wherein configuring said first device to determine information from at least one uplink transmission receivable from said second device through said smart antenna further includes:

configuring said first device to be capable of receiving uplink transmittable messages through said smart antenna; and configuring said first device to be capable of passively gathering signal parameter information from a plurality of said uplink transmittable messages.

20. The computer-readable medium as recited in claim 17, wherein configuring said first device to determine information from at least one uplink transmission receivable from said second device through said smart antenna further includes:

configuring said first device to be capable of receiving at least one uplink transmittable message through said smart antenna;

configuring said first device to actively probe said second device by outputting a signal suitable for causing said smart antenna to transmit at least one downlink transmittable message over at least said different beam; and configuring said first device to gather signal parameter information from said least one uplink transmittable message.

21. The computer-readable medium as recited in claim 20, wherein configuring said first device to determine information from at least one uplink transmission receivable from said second device through said smart antenna further includes:

configuring said first device to be capable of receiving a plurality of uplink transmittable messages through said smart antenna;

configuring said first device to actively probe said second device by outputting a signal suitable for causing said smart antenna to transmit at least one downlink transmittable message separately over each of a group of beams comprising said beam and said different beam; and configuring said first device to gather signal parameter information from each of said plurality of uplink transmittable messages.

22. The computer-readable medium as recited in claim 17, wherein configuring said first device to determine information from at least one uplink transmission receivable from said second device through said smart antenna further includes:

configuring said first device to be capable of determining information about a current position of said second device relative to said smart antenna.

23. The computer-readable medium as recited in claim 17, wherein configuring said first device to determine if said associated second device should operatively associate with said different beam downlink transmittable using said smart antenna based on said determined information further includes:

configuring said first device to be capable of comparing said determined information to corresponding beam association threshold information.

24. An apparatus for use in a wireless communication system, the apparatus comprising:

means for transmitting a plurality of smart antenna beams;

means for determining if a client device that is currently operatively associated with a first smart antenna beam should instead be operatively associated with a second smart antenna beam based on information determined from at least one transmission received from said client device;

means for forcing said client device to operatively associate with said second smart antenna beam when it is determined that said client device should be operatively associated with second smart antenna beam; and means for causing an access point device to temporarily stop transmitting to said client device using said first smart antenna beam.

25. The apparatus as recited in claim 24, further comprising:

means for passively gathering signal parameter information from a plurality of uplink transmitted messages from said client device.

26. The apparatus as recited in claim 24, further comprising:

means for transmitting at least one probe message to said client device over at least said second smart antenna beam;

means for receiving at least one uplink transmitted probe response message in response to said probe message; and means for gathering signal parameter information from said probe response message.

27. The apparatus as recited in claim 26, further comprising:

means for comparing said signal parameter information to corresponding beam association threshold information.

28. The apparatus as recited in claim 26, further comprising:

means for transmitting at least one downlink transmitted probe message separately over each of a group of smart antenna beams comprising said first and second smart antenna beams;

means for receiving a plurality of corresponding uplink transmitted prove response messages; and means for gathering signal parameter information from each of said plurality of probe response messages.

29. The apparatus as recited in claim 28, further comprising:

means for comparing said signal parameter information to corresponding smart antenna beam association threshold information.

30. The apparatus as recited in claim 24, further comprising:

means for determining information about a current position of said client device.

31. The apparatus as recited in claim 24, further comprising at least one of the following:

means for identifying that said client device is allowed to operatively associate with said second smart antenna beam; and means for identifying that said client device is not allowed to operatively associate with said first smart antenna beam.

32. The apparatus as recited in claim 24, further comprising:

means for sending a disassociate from first smart antenna beam message to said client device.

33. An apparatus for use in a wireless communication system, the apparatus comprising:

at least one smart antenna;

at least one transceiver operatively coupled to said smart antenna and configured to send and receive electromagnetic signals using said smart antenna; and logic operatively coupled to said transceiver and configured to selectively allow a second device to operatively associate with a beam downlink transmittable to said second device using said smart antenna, determine information from at least one uplink transmission receivable from said second device through said smart antenna, determine if said associated second device should operatively associate with a different beam downlink transmittable using said smart antenna based on said determined information, and if said associated second device should operatively associate with a different beam then allow said second device to operatively associate with said different beam and selectively identify that said second device is not allowed to operatively associate with said beam.

34. The apparatus as recited in claim 33, wherein said logic is further configured to passively gathering signal parameter information from a plurality of said uplink transmittable messages received by said transceiver using said smart antenna.

35. The apparatus as recited in claim 33, wherein said logic is further configured to:

actively probe said second device by causing said transceiver to output a signal to said smart antenna that causes said smart antenna to transmit at least one downlink transmittable message over at least said different beam; and gather signal parameter information from said least one uplink transmittable message received by said transceiver using said smart antenna.

36. The apparatus as recited in claim 35, wherein said logic is further configured to:

actively probe said second device by causing said transceiver to output a signal suitable to said smart antenna that causes said smart antenna to transmit at least one downlink transmittable message separately over each of a group of beams comprising said beam and said different beam; and gather signal parameter information from each of said plurality of uplink transmittable messages received by said transceiver using said smart antenna.

37. The apparatus as recited in claim 33, wherein said logic is further configured to:

determine information about a current position of said second device relative to said smart antenna.

38. The apparatus as recited in claim 33, wherein said logic is further configured to:

compare said determined information to corresponding beam association threshold information.

39. The apparatus as recited in claim 33, wherein said logic is further configured:

selectively identify that said second device is allowed to operatively associate with said different beam.

40. A wireless communication system comprising:

at least one client device; and at least one access point device operatively coupled to said client device over a wireless link and therein capable of transmitting a plurality of smart antenna beams, determining if said client device that is currently operatively associated with a first smart antenna beam should instead be operatively associated with a second smart antenna beam based on information determined from at least one transmission received from said client device, causing said client device to operatively associate with said second smart antenna beam when it is determined that said client device should be operatively associated with second smart antenna beam, and temporarily stopping transmission to said client device using said first smart antenna beam.

41. The system as recited in claim 40, wherein said access point device is further configured to gather signal parameter information from a plurality of uplink transmitted messages from said client device.

42. The system as recited in claim 40, wherein said access point device is further configured to:

transmit at least one probe message to said client device over at least said second smart antenna beam;

receive at least one uplink transmitted probe response message in response to said probe message; and gather signal parameter information from said probe response message.

43. The system as recited in claim 42, wherein said access point device is further configured to compare said signal parameter information to corresponding beam association threshold information.

44. The system as recited in claim 42, wherein said access point device is further configured to:

transmit at least one downlink transmitted probe message separately over each of a group of smart antenna beams comprising said first and second smart antenna beams;

receive a plurality of corresponding uplink transmitted prove response messages; and gather signal parameter information from each of said plurality of probe response messages.

45. The system as recited in claim 44, wherein said access point device is further configured to compare said signal parameter information to corresponding smart antenna beam association threshold information.

46. The system as recited in claim 40, wherein said access point device is further configured to determine information about a current position of said client device.

47. The system as recited in claim 40, wherein said access point device is further configured to perform at least one of the following:

identify that said client device is allowed to operatively associate with said second smart antenna beam; and identify that said client device is not allowed to operatively associate with said first smart antenna beam.

48. The system as recited in claim 40, wherein said access point device is further configured to send a disassociate from first smart antenna beam message to said client device.

* * * * *